March 25, 1924.

J. H. DRAKE

DEHYDRATOR

Filed May 31, 1923   2 Sheets-Sheet 1

1,488,324

INVENTOR:
JOHN H. DRAKE,
BY
ATTORNEYS.

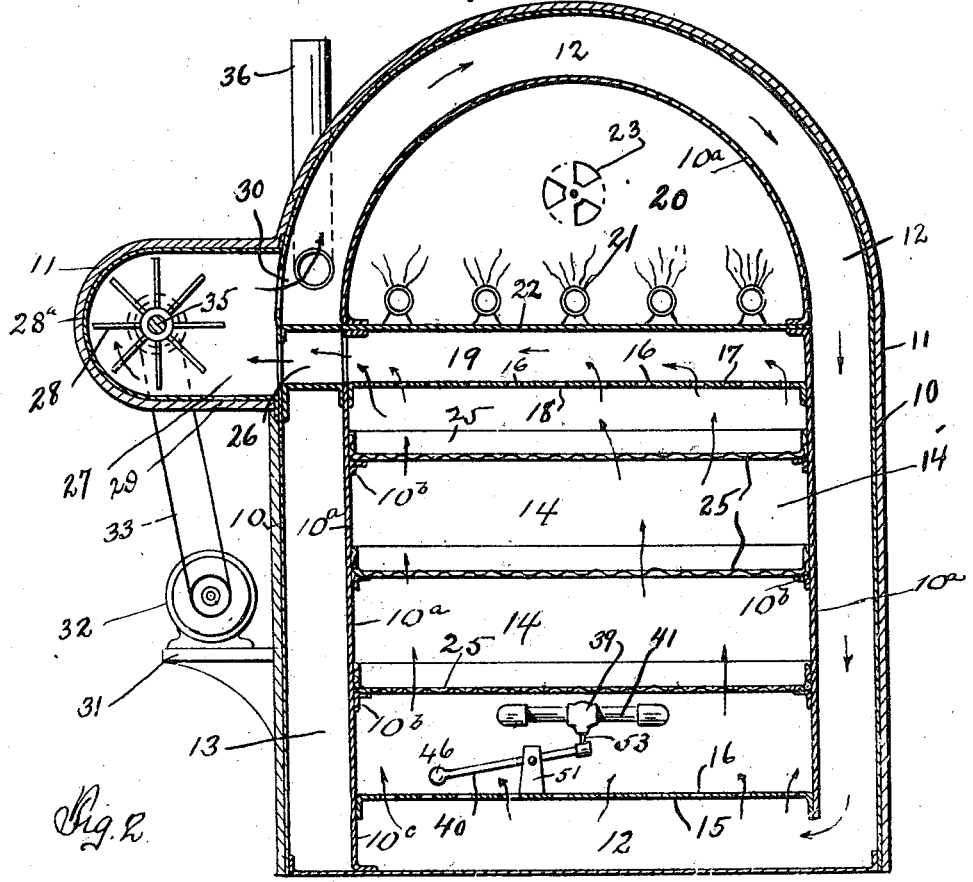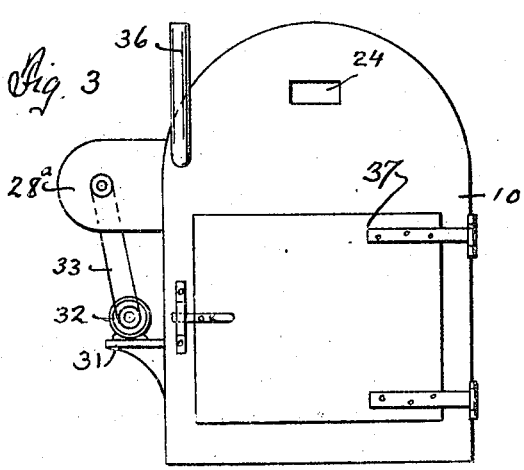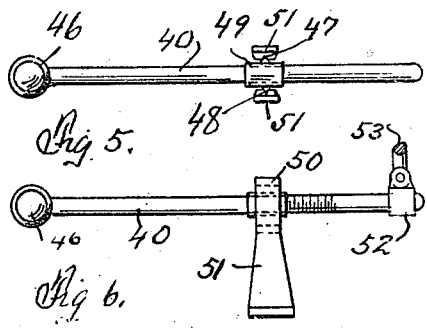

Patented Mar. 25, 1924.

1,488,324

UNITED STATES PATENT OFFICE.

JOHN H. DRAKE, OF OAKLAND, CALIFORNIA.

DEHYDRATOR.

Application filed May 31, 1923. Serial No. 642,632.

*To all whom it may concern:*

Be it known that I, JOHN H. DRAKE, a citizen of the United States, residing at Oakland, in the county of Alameda and State of California, have invented or discovered certain new and useful Improvements in Dehydrators, of which the following is a specification, reference being had therein to the accompanying drawings.

My invention relates to a dehydrator or drier for use in drying fruit and the like, and has for its principal object to provide a small device suitable for use by individual producers or growers and which can be made portable in any size suitable to accommodate the size of the crop of the producer or grower, or it may be built of large size and be permanently installed.

Another object is to provide a device of this character which can be manufactured and installed at a minimum cost and which will be simple and efficient in construction and efficient in operation.

A further object is to provide in a device of the above character simple automatic mechanism for regulating the supply of fuel and thus controlling the heat in the drying chamber.

Other objects and advantages will appear hereinafter, and while I have shown and will describe the preferred form of my invention, it will be understood that I do not limit myself to such preferred form but that various changes and adaptations may be made therein without departing from the spirit of my invention.

Figure 1:
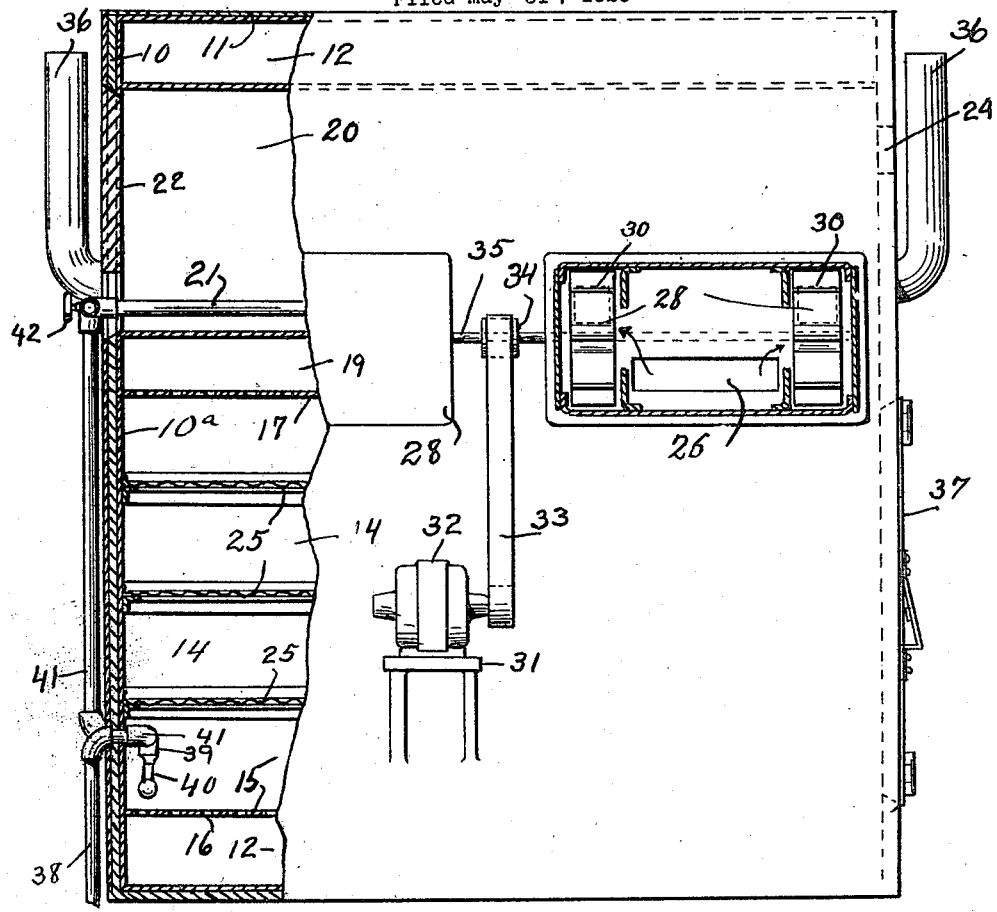
Figure 4:
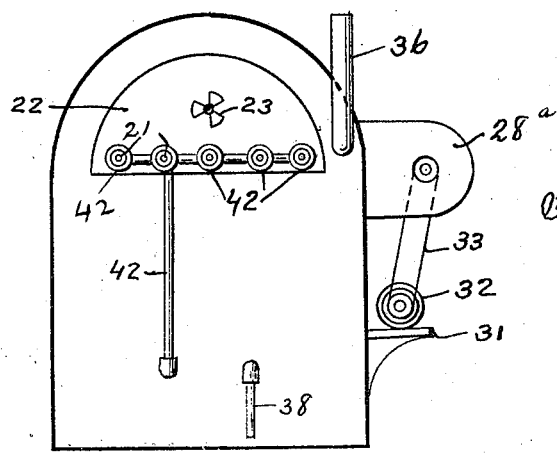

In the drawings Fig. 1 is a side elevation of my device, partly broken away. Fig. 2 is a central vertical section of the drier shown in Fig. 1. Figs. 3 and 4 are opposite end elevations of my device on a reduced scale. Figs. 5 and 6 are detail views of the heat controlling means.

Referring to the drawings, 10 denotes an outer casing which may be of any suitable material, preferably sheet metal, and preferably having a covering 11 of insulating or non-conducting material, as asbestos or the like. The top of the casing 10 is arched or semi-circular in cross section and inside of and separated from the casing 10 is a second casing 10ª conforming in shape generally to the casing 10. These separated casing parts afford between them an air circulating chamber 12 extending from the top of the dehydrator down one side thereof and to the bottom of the dehydrator.

The casing 10ª forms the side walls of a drying chamber 14, said side walls being provided on their inner sides with brackets 10ᵇ for supporting a series of reticulated drying trays 25 having bottoms of wire mesh or the like, through which the heated air may freely circulate. The bottom and top walls 15 and 17 of the drying chamber are provided with openings 16 for the passage of air. The bottom part of the circular chamber 12 is closed at one side of the dehydrator by a downward continuation 10ᶜ of the inner casing 10ª leaving an insulating air chamber 13 between one wall of the casing 10ª and the outer casing 10.

Above the heating chamber 14 and communicating with the said chamber through the openings 16 in the top wall 17 is a vacuum or suction chamber 19 which opens, through a passageway 26, into an induction chamber 27 formed by a casing 28ª and in which are mounted air pumps or suction fans 28 on a shaft 35 driven from an electric motor 32 through a belt 33 and pulley 34. The motor 32 is mounted on a bracket 31 supported by the outer casing 10.

Above the suction chamber 19 is a heating chamber 20 in which are arranged a series of burner pipes or burners 21 supported on a plate or floor 22 forming the upper wall of the suction chamber 19, said chamber 20 being provided with one or more inlets, as 23, for the admission of air to support combustion. An opening 24 is provided in the wall opposite the inlet opening or openings 23, for the escape of the products of combustion.

The induction chamber 27 communicates with the air circulating chamber or passageway 12 through openings 30, and said passageway 12 communicates with outlet flues 36 which permit the escape of a certain part of the heated and moisture laden air from the dehydrator, the air thus escaping being replaced by air from air admission openings preferably located near the upper part of the dehydrator, such, for example, as the opening 29 in the casing 28ª of the induction chamber 27. Access to the drying chamber 14 is afforded by an air tight door 37.

The burner pipes 21 are supplied with any suitable liquid or gaseous hydrocarbon through a supply pipe 41 which may be closed to the said burner pipes 21 by means of valves 42. A controlling valve for the admission of the hydrocarbon is located at the lower horizontal part of the pipe 41, at 39, said pipe 41 communicating with a supply pipe 38 which will in turn be connected with any suitable source of supply of the hydrocarbon.

For the purpose of automatically regulating the supply of fuel to the burner pipes 21 a thermostat is preferably provided. This thermostat, in the form herein shown, consists of a tube 40, like an ordinary thermometer tube, and provided with a bulb 46. This tube is mounted in a sleeve 49 pivotally mounted, by means of pointed trunnions 47 and 48, in standards 51 supported on the lower perforated wall 16 of the heating chamber 14. To the end of said tube 47 opposite the bulb 46 is attached a sleeve 52 to which the lower end of a valve controlling rod 53 is pivotally attached. By the contraction and expansion of the mercury in the tube 40 more or less of the mercury will run into the bulb 46, and the tube 40 being mounted to move easily on the pointed trunnions 47 and 48 will automatically adjust itself, by pivotal movement on said trunnions, according to the degree of heat in the furnace, so as to control the admission valve at 39 (and thus automatically regulate the admission of hydrocarbon to the pipe 41) through the connection 53.

In the operation of the invention the trays 25, filled with fruit or other materials or articles to be dried, are placed in the heated drying chamber 14, and the motor 32 is then started to drive the air pumps or fans 28 which will tend to exhaust the air from the suction chamber 19 and force heated air through the circulation and drying chambers back to said suction chamber and thereby rapidly drying the fruit, etc. in the drying chamber, by such continuous circulation of heated air.

While, for a simple portable device, it is preferred to construct the improved dehydrator largely of sheet metal, as shown, for a permanent structure brick or other materials may be employed, as will be understood.

Having thus described my invention I claim and desire to secure by Letters Patent:

1. A dehydrator comprising a drying chamber having perforations or openings in its top and bottom walls, a heating chamber located above said drying chamber, a suction chamber between said drying and heating chambers and into which said drying chamber opens, an air circulating chamber located above said heating chamber and extending down the side of and beneath the lower perforated wall of said drying chamber, and means for causing a circulation of air over said heating chamber and through said drying chamber.

2. A dehydrator comprising a drying chamber having perforated upper and lower walls, a plurality of reticulated trays in said drying chamber, a heating chamber above said drying chamber, a suction chamber separating said drying and heating chambers, an air circulating chamber above said heating chamber and extending down the side of and beneath the lower wall of the said drying chamber, and means for causing a current of heated air to flow through said circulating and drying chambers.

3. A dehydrator comprising a drying chamber having openings in its upper and lower walls, a suction chamber above the upper wall of said drying chamber, a heating chamber above said suction chamber, an air chamber surrounding the upper wall of said heating chamber and passing down to and beneath said drying chamber, an air induction chamber communicating with said suction and circulating chambers, and air forcing means in said induction chamber whereby to cause a continuous circulation of heated air through said dehydrator.

4. A dehydrator comprising a drying chamber having perforations or openings in its top and bottom walls, a heating chamber located above said drying chamber, a suction chamber between said drying and heating chambers and into which said drying chamber opens, an air circulating chamber located above said heating chamber and extending down the side of and beneath the lower perforated wall of said drying chamber, means for causing a circulation of air over said heating chamber and through said drying chamber, burners in said heating chamber, and means for automatically controlling the supply of fuel to said burners and thereby automatically regulating the heat of said drying chamber.

5. A dehydrator comprising a drying chamber having perforated upper and lower walls, a plurality of reticulated trays in said drying chamber, a heating chamber above said drying chamber, a suction chamber separating said drying and heating chambers, an air circulating chamber above said heating chamber and extending down the side of and beneath the lower wall of the said drying chamber, means for causing a current of heated air to flow through said circulating and drying chambers, burners in said heating chamber, and means for automatically controlling the supply of fuel to said burners and thereby automatically regulating the heat of said drying chamber.

6. A dehydrator comprising a drying chamber having openings in its upper and lower walls, a suction chamber above the upper wall of said drying chamber, a heating chamber above said suction chamber, an air chamber surrounding the upper wall of said heating chamber and passing down to and beneath said drying chamber, an air induction chamber communicating with said suction and circulating chambers, air forcing means in said induction chamber whereby to cause a continuous circulation of heated air through said dehydrator, burners in said heating chamber, and means for automatically controlling the supply of fuel to said burners and thereby automatically regulating the heat of said drying chamber.

In testimony whereof I affix my signature.

JOHN H. DRAKE.